US012245671B2

(12) United States Patent
Druker et al.

(10) Patent No.: US 12,245,671 B2
(45) Date of Patent: Mar. 11, 2025

(54) CAMERA CASE

(71) Applicant: GoPro, Inc., San Mateo, CA (US)

(72) Inventors: Joshua T. Druker, Redwood City, CA (US); Matthew David Thomas, Castro Valley, CA (US); Huy Phuong Nguyen, Alpine, UT (US); Bessy Liang, San Jose, CA (US); Daniel J. Coster, Oakura (NZ)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 18/367,786

(22) Filed: Sep. 13, 2023

(65) Prior Publication Data

US 2023/0413963 A1     Dec. 28, 2023

Related U.S. Application Data

(63) Continuation of application No. 16/989,286, filed on Aug. 10, 2020, now Pat. No. 11,786,025.
(Continued)

(51) Int. Cl.
*A45C 11/38*     (2006.01)
*A45C 13/00*     (2006.01)
*G03B 17/56*     (2021.01)

(52) U.S. Cl.
CPC ............ *A45C 11/38* (2013.01); *A45C 13/008* (2013.01); *G03B 17/561* (2013.01)

(58) Field of Classification Search
CPC ......................... G03B 17/56–566; A45C 11/38
See application file for complete search history.

(56) References Cited

U.S. PATENT DOCUMENTS

| 679,881 A | 8/1901 | Bullard |
| 1,467,556 A | 9/1923 | Nagel |
| (Continued) | | |

FOREIGN PATENT DOCUMENTS

| CN | 302944108 | 5/2014 |
| CN | 303933789 | 6/2016 |
| GB | 4034453 | 3/2014 |

OTHER PUBLICATIONS

Bergsma, Mic. "Bodhi Floaty Review", Mar. 29, 2017. https://www.youtube.com/watch?v=UqvlA96lp80 (Year: 2017).*
(Continued)

*Primary Examiner* — Leon W Rhodes, Jr.
(74) *Attorney, Agent, or Firm* — Young Basile Hanlon & MacFarlane, P.C.

(57) ABSTRACT

A camera case that includes a buoyant material. The buoyant material forms a cavity defined by a top side, a right side, a bottom side, and a left side, and the cavity is configured to removably receive a camera. A front opening extends into the cavity. A rear opening is located opposite the front opening, and the rear opening is larger than the front opening so that the camera is extendable into the cavity through the rear opening. A button recess in the top side is aligned with a physical input interface of the camera. A mount opening extends through the bottom side of the camera case to receives a portion of a support member so that the support member and the camera are connectable through the mount opening. The camera case includes a sufficient amount of the buoyant material to float the camera in water when the camera is inserted into the cavity.

18 Claims, 10 Drawing Sheets

Related U.S. Application Data

(60) Provisional application No. 62/908,129, filed on Sep. 30, 2019.

(56) References Cited

U.S. PATENT DOCUMENTS

| | | |
|---|---|---|
| 1,612,277 A | 12/1926 | Leo |
| 2,336,104 A | 12/1943 | Laube |
| 4,341,452 A | 7/1982 | Korling |
| D265,829 S | 8/1982 | Shimoda |
| 4,646,141 A | 2/1987 | Timmermans |
| 4,763,151 A | 8/1988 | Klinger |
| D298,760 S | 11/1988 | Yoshida |
| 5,092,552 A | 3/1992 | Dayton |
| 5,325,139 A | 6/1994 | Matsumoto |
| D349,126 S | 7/1994 | Lee |
| 5,353,079 A | 10/1994 | Sakai |
| 5,576,781 A | 11/1996 | Deleeuw |
| 5,738,321 A | 4/1998 | Moriyasu |
| D441,386 S | 5/2001 | Yamazaki |
| 6,347,893 B1 | 2/2002 | Shiono |
| D469,338 S | 1/2003 | Chace |
| D491,968 S | 6/2004 | Isshiki |
| D492,953 S | 7/2004 | Mitsuse |
| D499,131 S | 11/2004 | Tania |
| D504,904 S | 5/2005 | Nagai |
| D515,121 S | 2/2006 | Bleau |
| D550,741 S | 9/2007 | Vernon |
| D563,486 S | 3/2008 | Slater |
| D582,955 S | 12/2008 | Sekine |
| 7,537,399 B2 | 5/2009 | Mayumi |
| D594,050 S | 6/2009 | Hartmut |
| 7,621,680 B2 | 11/2009 | Frick |
| D616,480 S | 5/2010 | Ookawa |
| 8,014,656 B2 | 9/2011 | Woodman |
| D646,313 S | 10/2011 | Woodman |
| D647,554 S | 10/2011 | Yim |
| D647,935 S | 11/2011 | Raken |
| D653,687 S | 2/2012 | Yu |
| D657,808 S | 4/2012 | Woodman |
| D674,428 S | 1/2013 | Woodman |
| D684,569 S | 6/2013 | Willenborg |
| 8,467,675 B2 | 6/2013 | Chen |
| D692,507 S | 10/2013 | Meys |
| 8,544,643 B2 | 10/2013 | Yim |
| 8,596,890 B2 | 12/2013 | Yim |
| D699,276 S | 2/2014 | Samuels |
| D699,277 S | 2/2014 | Samuels |
| D702,747 S | 4/2014 | Woodman |
| 8,718,457 B2 | 5/2014 | Clark |
| D706,603 S | 6/2014 | Kokawa |
| D710,921 S | 8/2014 | Gioscia |
| D710,922 S | 8/2014 | Gioscia |
| 8,794,579 B2 | 8/2014 | Sturman |
| D722,097 S | 2/2015 | Kim |
| D724,637 S | 3/2015 | Samuels |
| D724,638 S | 3/2015 | Samuels |
| D725,169 S | 3/2015 | Gioscia |
| D727,387 S | 4/2015 | Hasegawa |
| 9,004,783 B1 | 4/2015 | Woodman |
| D730,423 S | 5/2015 | Vandenbussche |
| D732,593 S | 6/2015 | Woodman |
| D732,601 S | 6/2015 | Coyle |
| D733,787 S | 7/2015 | Baker |
| D733,788 S | 7/2015 | Baker |
| D736,848 S | 8/2015 | Kim |
| D737,647 S | 9/2015 | Elder |
| D739,451 S | 9/2015 | Gioscia |
| D740,876 S | 10/2015 | Woodman |
| D741,394 S | 10/2015 | Gioscia |
| D745,589 S | 12/2015 | Lee |
| D749,164 S | 2/2016 | Raccah |
| D750,146 S | 2/2016 | Costa |
| D750,680 S | 3/2016 | Chen |
| D750,687 S | 3/2016 | Samuels |
| D752,671 S | 3/2016 | Harrison |
| D752,672 S | 3/2016 | Clearman |
| 9,282,226 B2 | 3/2016 | Samuels |
| D754,230 S | 4/2016 | Mori |
| D754,240 S | 4/2016 | Samuels |
| D755,277 S | 5/2016 | Gerd |
| D758,474 S | 6/2016 | Harrison |
| D759,141 S | 6/2016 | Bacon |
| D759,145 S | 6/2016 | Lee |
| D760,309 S | 6/2016 | Parfitt |
| D760,312 S | 6/2016 | Lee |
| 9,360,742 B1 | 6/2016 | Harrison |
| D762,759 S | 8/2016 | Wu |
| D763,941 S | 8/2016 | Smith |
| D768,228 S | 10/2016 | Muhlenkamp, IV |
| D768,752 S | 10/2016 | Silver |
| D768,754 S | 10/2016 | Bennett |
| D769,346 S | 10/2016 | Nguyen |
| D773,546 S | 12/2016 | Nguyen |
| D776,738 S | 1/2017 | Clearman |
| D776,741 S | 1/2017 | Parfitt |
| D777,239 S | 1/2017 | Costa |
| D778,335 S | 2/2017 | Gioscia |
| 9,598,153 B2 * | 3/2017 | Connolly ............... A63B 31/10 |
| D783,079 S | 4/2017 | Lee |
| D785,068 S | 4/2017 | Patsis |
| 9,635,226 B2 | 4/2017 | Samuels |
| D785,696 S | 5/2017 | Parfitt |
| D785,697 S | 5/2017 | Costa |
| D789,435 S | 6/2017 | Nguyen |
| D789,999 S | 6/2017 | Yakabe |
| D790,000 S | 6/2017 | Wang |
| D790,002 S | 6/2017 | Nguyen |
| D800,815 S | 10/2017 | Clearman |
| D800,819 S | 10/2017 | Parfitt |
| 9,816,666 B2 | 11/2017 | Wang |
| D806,775 S | 1/2018 | Nguyen |
| D808,163 S | 1/2018 | Song |
| 9,880,451 B2 | 1/2018 | Clearman |
| 9,894,278 B2 | 2/2018 | Wei |
| 9,894,279 B2 | 2/2018 | Wei |
| 9,903,533 B2 | 2/2018 | Wei |
| D816,751 S | 5/2018 | Harrison |
| D819,117 S | 5/2018 | Lee |
| D821,476 S | 6/2018 | Martin |
| D821,481 S | 6/2018 | Gioscia |
| D827,696 S | 9/2018 | Crow |
| D827,697 S | 9/2018 | Crow |
| 10,101,637 B2 | 10/2018 | Peddecord |
| D837,861 S | 1/2019 | Luo |
| D840,463 S | 2/2019 | Nguyen |
| D846,620 S | 4/2019 | Katori |
| D848,500 S | 5/2019 | Miyashita |
| D849,084 S | 5/2019 | Hu |
| D850,520 S | 6/2019 | Voss |
| D851,155 S | 6/2019 | Hu |
| D854,597 S | 7/2019 | Gao |
| D856,391 S | 8/2019 | Liu |
| D861,761 S | 10/2019 | Bergman |
| D867,420 S | 11/2019 | Zhang |
| D867,427 S | 11/2019 | Bai |
| D868,871 S | 12/2019 | Nguyen |
| D869,539 S | 12/2019 | Hu |
| D871,480 S | 12/2019 | Hu |
| D872,156 S | 1/2020 | Zhao |
| D880,567 S | 4/2020 | Zhang |
| D880,569 S | 4/2020 | Zhang |
| D881,254 S | 4/2020 | Guo |
| D884,061 S | 5/2020 | Arens |
| D888,792 S | 6/2020 | Luo |
| D890,835 S | 7/2020 | Nguyen |
| D891,500 S | 7/2020 | Tang |
| D904,498 S | 12/2020 | Lim |
| D907,680 S | 1/2021 | Nguyen |
| D908,778 S | 1/2021 | Xu |
| D909,450 S | 2/2021 | Grant |
| D911,411 S | 2/2021 | Coster |
| D911,412 S | 2/2021 | Alberstein |
| D912,120 S | 3/2021 | Druker |
| D920,419 S | 5/2021 | Muhlenkamp, IV |

(56) References Cited

U.S. PATENT DOCUMENTS

| | | | |
|---|---|---|---|
| D921,084 S | 6/2021 | Muhlenkamp, IV |
| D924,297 S | 7/2021 | Imai |
| D925,643 S | 7/2021 | Hsu |
| D926,853 S | 8/2021 | Wei |
| D929,489 S | 8/2021 | Coster |
| D933,115 S | 10/2021 | Druker |
| D934,945 S | 11/2021 | Wu |
| D935,506 S | 11/2021 | Tan |
| D939,608 S | 12/2021 | Han |
| D941,904 S | 1/2022 | Coster |
| D943,654 S | 2/2022 | Jiang |
| 11,258,988 B1 | 2/2022 | Douglas Dudley |
| D946,071 S | 3/2022 | Muhlenkamp |
| D946,072 S | 3/2022 | Muhlenkamp |
| D946,074 S | 3/2022 | Muhlenkamp |
| D947,920 S | 4/2022 | Muhlenkamp |
| D949,222 S | 4/2022 | Bergman |
| D950,624 S | 5/2022 | George |
| D954,776 S | 6/2022 | Muhlenkamp |
| 2002/0046218 A1 | 4/2002 | Gilbert |
| 2007/0071423 A1 | 3/2007 | Fantone |
| 2008/0152337 A1 | 6/2008 | Gartner |
| 2011/0317065 A1 | 12/2011 | Lin |
| 2014/0185853 A1 | 7/2014 | Aihara |
| 2014/0198932 A1 | 7/2014 | Parkins |
| 2014/0226055 A1 | 8/2014 | Schmidt |
| 2015/0168815 A1 | 6/2015 | Chen |
| 2015/0316835 A1 | 11/2015 | Scott |
| 2015/0326748 A1 | 11/2015 | Tisch |
| 2016/0004142 A1 | 1/2016 | Zhang |
| 2016/0100083 A1 | 4/2016 | Harrison |
| 2016/0229556 A1 | 8/2016 | Zhou |
| 2016/0246162 A1 | 8/2016 | Niemeyer |
| 2017/0059967 A1 | 3/2017 | Harrison |
| 2017/0192341 A1 | 7/2017 | Casarez |
| 2019/0079373 A1 | 3/2019 | Wang |
| 2019/0161208 A1 | 5/2019 | Sun |
| 2021/0093058 A1 | 4/2021 | Druker |
| 2022/0053118 A1 | 2/2022 | Nashizawa |

OTHER PUBLICATIONS

Air Photography. "Bodhi Floaty for GoPro Hero 5 Black". Aug. 1, 2017. https://www.youtube.com/watch?v=-HpXfvQtPBs (Year: 2017).*

Floating Hand Grip & Floating Case for Osmo Action. Air Photography, Sep. 14, 2019. https://www.youtube.com/watch?v=XNxlZk0bva4. (Year: 2019).*

Action Video Suction Cup. [online] Published date Oct. 23, 2014. Retrieved on Nov. 2, 2016 from <URL: <https://www.amazon.com/Suction-Locking-JOBY-Easy-Anti-Vibration-Cameras/dp/B0008R7A72/ref=pd sim 421 2?encoding=UTF8&pd rd i=B0008R7A72&pd rd r=AGCVZH2ZHQKHT5BBX2GZ&pdrd_w=7Jkpc&pdrd_wg=OMKYF&psc=1&refRID=AGCVZH2ZHQKHT5BBX2GZ>. (9 pages).

Google Express IGoPro Karma Harness for HERO4 Black/Silver Camera—AGFHA-001 , first reviewed on Mar. 17, 2017, © 2018 Google [online], [site visited Mar. 16, 2018]. Available from Internet, <URL: https://goo.gl/hugSGv/> 1 page.

GoPro i Shop i Mounts & Accessories, posted on Nov. 16, 2017, © 2018 GoPro, Inc. [online], [site visited Mar. 16, 2018]. Available from Internet, <URL: https://shop.gopro.com/mounts-accessories/> (13 Pgs).

GoPro The Frame for HERO5 Black. [online] Published date unknown. Retrieved on Oct. 26, 2016 from <URL: https://www.bhphotovideo.com/c/product/1274422-REG/gopro.sub.--aafrm.sub.---001.sub.--frame.sub.--for.sub.--hero5.html>. 3 pages.

GoPro, "Karma Stabilizer," Date Unknown, two pages. [Online] [Retrieved Nov. 2, 2016] Retrieved from the internet <http://shop.gopro.com/accessories-2/karma-stabilizer/AGMBL-001.html>. (2 pages).

Linxv i Action Camera Accessories i Action Camera Strap, posted on Jun. 4, 2016, © 2012 Avada [online], [site visited Mar. 16, 2018]. Available from Internet, <URL: http://www.linxv.com/action-camera-accessories/action-camera-strap/> (4 Pgs).

Silicon Sleeve Cases for the Frame of Your Gopro Hero 5 , retrieved from URL: https://www.amazon.com/Silicone-Sleeve-Cases-Frame-Gopro/dp/B01NCQ3GOY, retrieved Mar. 30, 2018 (6 pages).

Silicon Sleeve for GoPro Her04 Housing—GOcase, retrieved from URL: https://www.gocase.com/products/silicon-sleeve-for-gopro-hero4-housing, retrieved Mar. 30, 2018 (2 pages).

Silicone Sleeve Cases for The Frame of your Gopro Hero 5 (1x Frame / 1x Camera Case, Blue + Black), URL: https://www.amazon.com/dp/B01MR00OPJ/ref=asc_df_B01MR00OPJ5357481/?tag=hyprod-20&creative=395033&creativeASIN=B01MR00OPJ&linkCode=df0&hvadid=167139098072&hvpos=101&hvnetw=g&hvrand=8248390090609077295&hvpone=&hvptwo=&hvqmt=&hvdev=c&hvdvcmdl=&hvlocint=&hvlocphy=1014237&hvtargid=pla-332273337114, retrieved Mar. 30, 2018 (6 pages).

Suction Cup & Locking Arm. Online, published date unknown. Retrieved on Jan. 11, 2018 from URL: https://joby.com/suction-cup-with-locking-arm (1 page).

The Frame. [online] Published date unknown. Retrieved on Oct. 24, 2016 from <URL: http://shop.gopro.com/accessories-2/the-frame/ANDFR-302.html>. 3 pages.

United States Office Action, U.S. Appl. No. 29/548,666, Nov. 17, 2016, 8 pages.

* cited by examiner

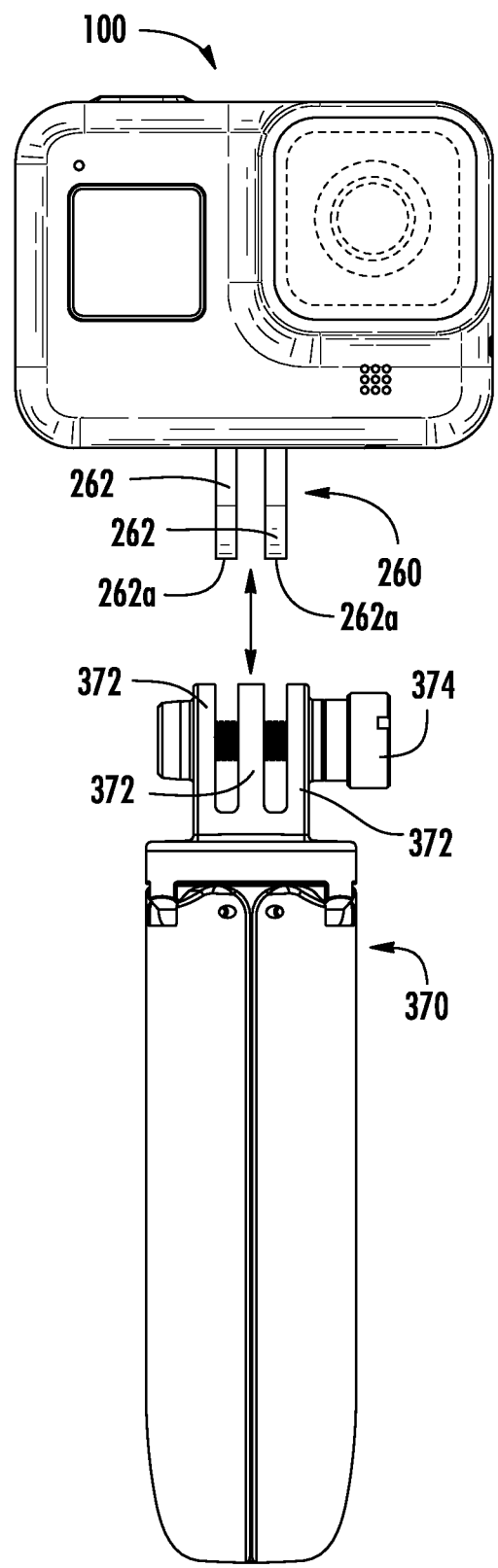
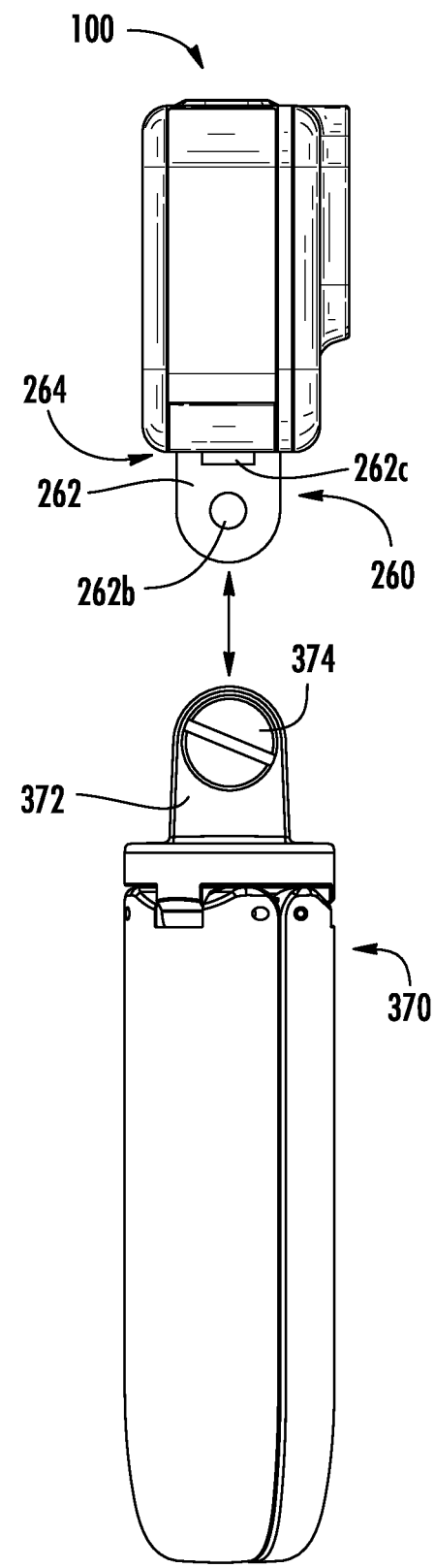
FIG. 3A
FIG. 3B

CAMERA CASE

CROSS-REFERENCE TO RELATED APPLICATION(S)

This application is a continuation of Ser. No. 16/989,286, filed Aug. 10, 2020, which claims priority to U.S. Provisional Patent Application No. 62/908,129, filed on Sep. 30, 2019, the contents of which are hereby incorporated by reference in their entirety.

TECHNICAL FIELD

This disclosure relates to cameras and, more particularly, structures thereof and camera cases therefor.

BACKGROUND

A camera is an electronic image capture device that captures images and may also record audio. Depending on their environment and types of use, cameras may be subject to adverse environmental conditions (e.g., water, debris, temperature) and forces (e.g., impacts with other objects).

SUMMARY

Disclosed herein are implementations of cameras, camera cases therefor, and camera systems.

In one implementation, a camera system includes a camera and a camera case. The camera includes a lens on a front side thereof, a rear display screen on a rear side thereof, and a mount on a bottom side thereof. The camera case is formed of a compliant foam material that defines a cavity in which the camera is removably received, a front opening that allows light to pass to the front lens, a rear opening through which the rear display screen is visible, and a mount opening through which the mount extends. The camera case includes a sufficient amount of the compliant foam material for the camera system to float in water. The camera case may extend rearward from the rear side of the camera at least 50% further than the camera case extends from the front side, a top side, a left side, and a right side of the camera. A rear side of the camera case may reduce in height moving rearward from the camera. The rear opening in the camera case may reduce in height moving rearward from the camera. The camera may include a button, and the camera case may define a button recess on an outer surface thereof at a corresponding location to the button; a user may press the button by pressing the compliant foam material of the case that defines the button recess.

In one implementation, a camera system includes a camera and a camera case. The camera includes a lens on a front side thereof and a rear display screen on a rear side thereof. The camera case is formed of a compliant foam material that defines a cavity in which the camera is removably received, a front opening that allows light to pass to the front lens, a rear opening through which the rear display screen is visible, and a mount opening through which the mount extends. The camera case includes a sufficient amount of the compliant foam material for the camera system to float in water. The camera case extends rearward from a rear side of the camera farther than the camera case extends from a front side of the camera.

In one implementation, a camera case includes a compliant foam material that defines a cavity in which a camera is removably received, a front opening that allows light to pass to a front lens of the camera, and a rear opening through which a rear display screen of the camera is visible. The camera case includes a sufficient amount of the compliant foam material for the camera to float in water. The camera case extends rearward from a rear side of the cavity farther than the camera case extends from a front side of the cavity.

In one implementation, a camera system includes a camera and a camera case. The camera includes a lens on a front side thereof, a rear display screen on a rear side thereof, and a button on an outer surface thereof. The camera case is formed of a compliant foam material that defines a cavity in which the camera is removably received. The camera case includes a sufficient amount of the compliant foam material for the camera system to float in water. The camera case defines a button recess that is aligned with the button of the camera. The button recess has a depth measured from an outer surface of the camera case that is 25% or more of a thickness of the compliant foam material therearound.

In one implementation, a camera system includes a camera and a camera case. The camera includes a lens on a front side thereof, a rear display screen on a rear side thereof, and a mount on a bottom side thereof. The camera case is formed of a compliant foam material that defines a cavity in which the camera is removably received, a front opening that allows light to pass to the lens, a rear opening through which the rear display screen is visible, and a mount opening through which the mount extends. The camera case includes a sufficient amount of the compliant foam material for the camera system to float in water. The camera case may extend rearward from the rear side of the camera at least 50% further than the camera case extends from the front side, a top side, a left side, and a right side of the camera; a rear side of the camera case reduces in height moving rearward from the camera; and the rear opening reduces in height moving rearward from the camera. The camera case may define a button recess that is aligned with the button of the camera, the button recess having a depth measured from an outer surface of the camera case that is 25% or more of a thickness of the compliant foam material therearound.

In one implementation, a camera case that includes a buoyant material. The buoyant material that forms a cavity defined by a top side, a right side, a bottom side, and a left side, the cavity is configured to removably receive a camera. A front opening extending into the cavity. A rear opening located opposite the front opening, wherein the rear opening is larger than the front opening so that the camera is extendable into the cavity through the rear opening. A button recess in the top side that aligns with a physical input interface of the camera. A mount opening extending through the bottom side of the camera case that receives a portion of a support member so that the support member and the camera are connectable through the mount opening. The camera case includes a sufficient amount of the buoyant material to float the camera in water when the camera is inserted into the cavity.

In one implementation, a camera case includes a buoyant material, a rear opening, and a button recess. The buoyant material defines a cavity in which a camera is removably received; a front opening extending through a front surface of the buoyant material. The rear opening located opposite the front opening and extending through a rear surface of the buoyant material with the cavity being located between the front opening and the rear opening. The button recess is located in a top surface, a right surface, a left surface, a bottom surface, or a combination thereof, wherein the front opening and the rear opening are bounded by the top surface, the right surface, the left surface, and the bottom surface of the buoyant material. The camera case includes a sufficient amount of the buoyant material for a camera system comprising the camera and the camera case to float in water.

In one implementation, a camera case includes a buoyant material, a front opening, and a rear opening. The buoyant material defines a cavity configured to removably receive a camera. The front opening is located on a front side of the cavity. The rear opening is located on a rear side of the cavity opposite the front opening. The camera case includes a sufficient amount of the buoyant material for the camera case to float in water. The front opening and the rear opening surround the camera when the camera is received in the camera case so that a front surface of the camera is exposed through the front opening and a rear surface of the camera is exposed through the rear opening.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 3A is a front view of the camera of FIG. 1B and a support device therefor.

FIG. 3B is a right view of the camera of FIG. 1B and the support device of FIG. 3A.

DETAILED DESCRIPTION

Described herein are cameras, camera cases, and camera systems that include cameras, camera cases, and other devices. As used herein, the term "camera" is an electronic device that captures images. A camera is considered to include any electronic device having a primary function of capturing images and having tangential functions related to capturing images, such as storing, processing, displaying or otherwise outputting, and transferring captured images and associated audio. A camera is also considered to include any electronic device having other functions unrelated to image capture, such as a communications device having functions for both user communication and image capture (e.g., a smartphone) or a portable computing device having functions for both personal computing and image capture (e.g., a tablet or laptop computer). A camera may alternatively be referred to as an image capture device or a digital image capture device.

Figure 1A:
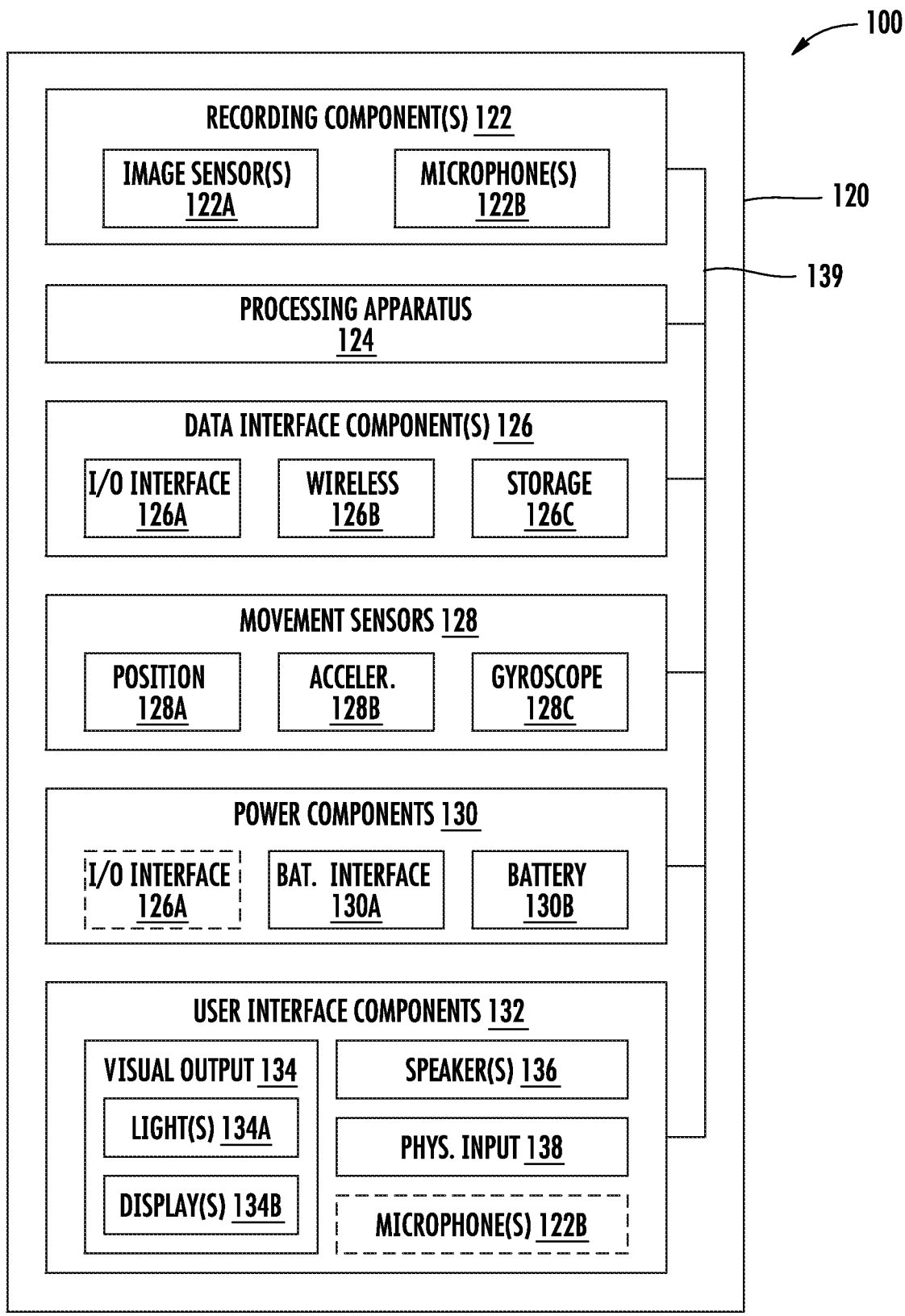
FIG. 1A is a block diagram of electronic components of a camera.
Figure 1B:
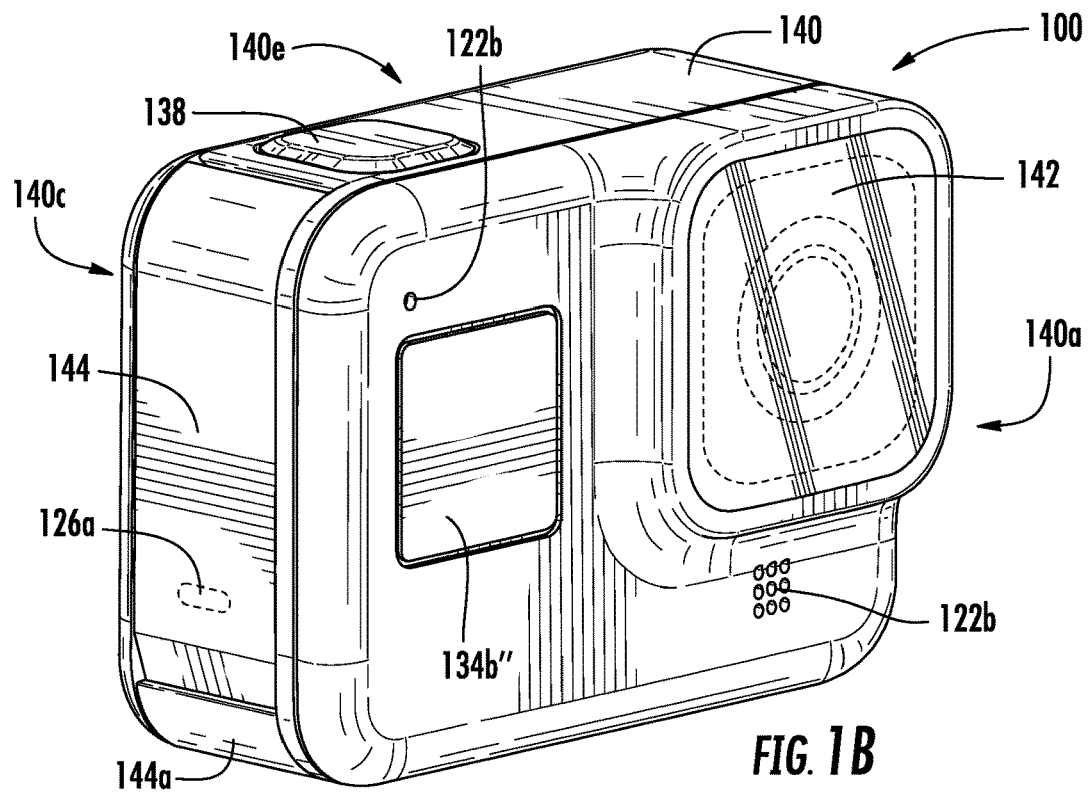
FIG. 1B is an upper, front, left perspective view of a first physical embodiment of the camera of FIG. 1A.
Figure 1C:
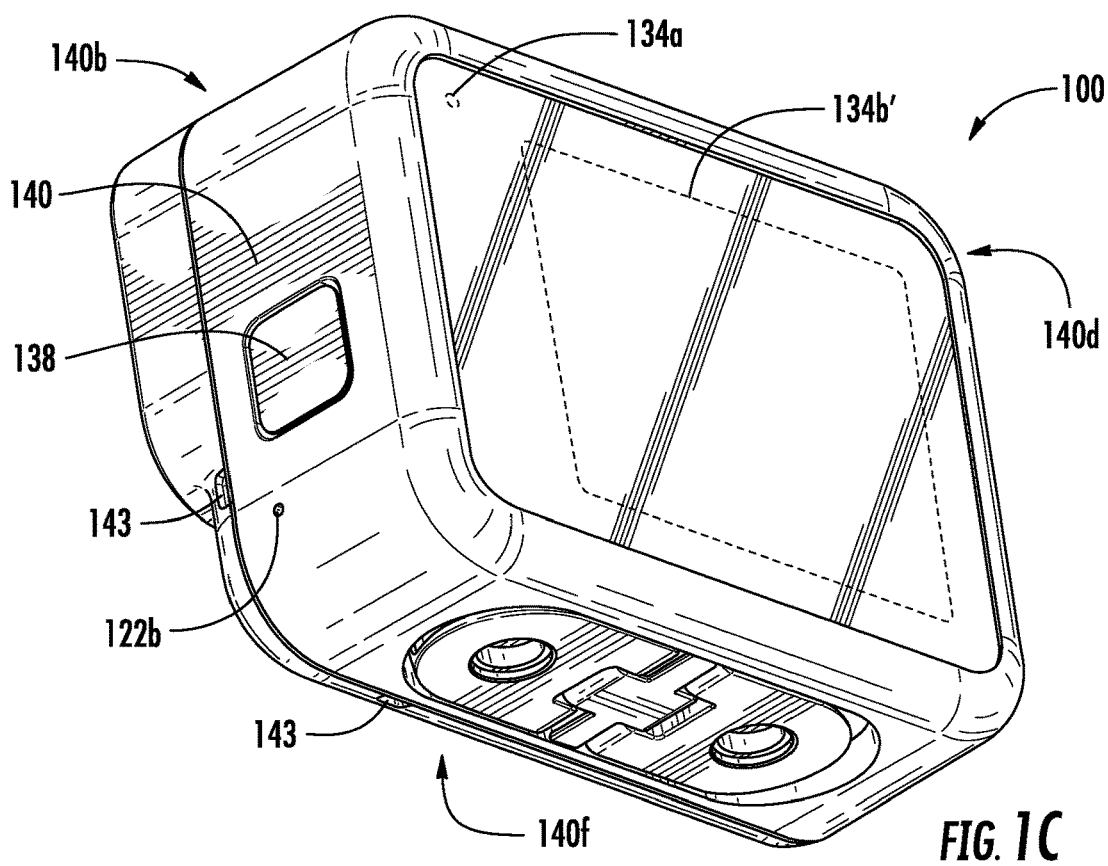
FIG. 1C is a lower, rear, left perspective view of the camera of FIG. 1B.
Figure 1D:
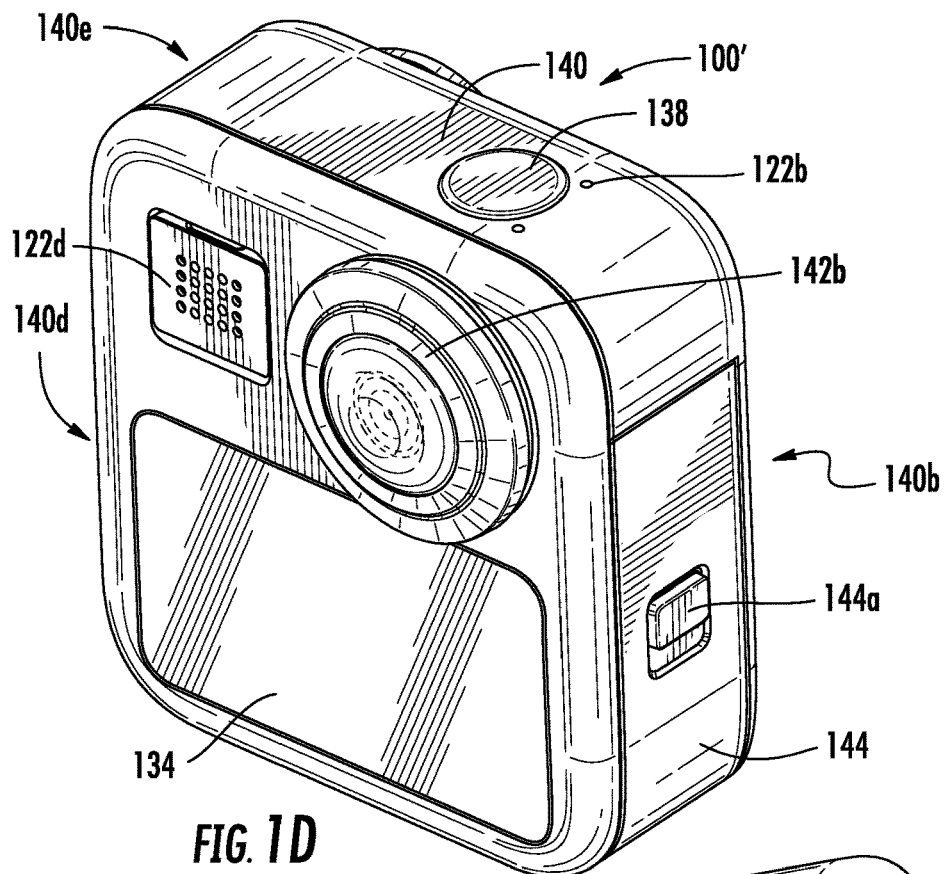
FIG. 1D is an upper, rear, right perspective view of a second physical embodiment of the camera of FIG. 1A.
Figure 1E:
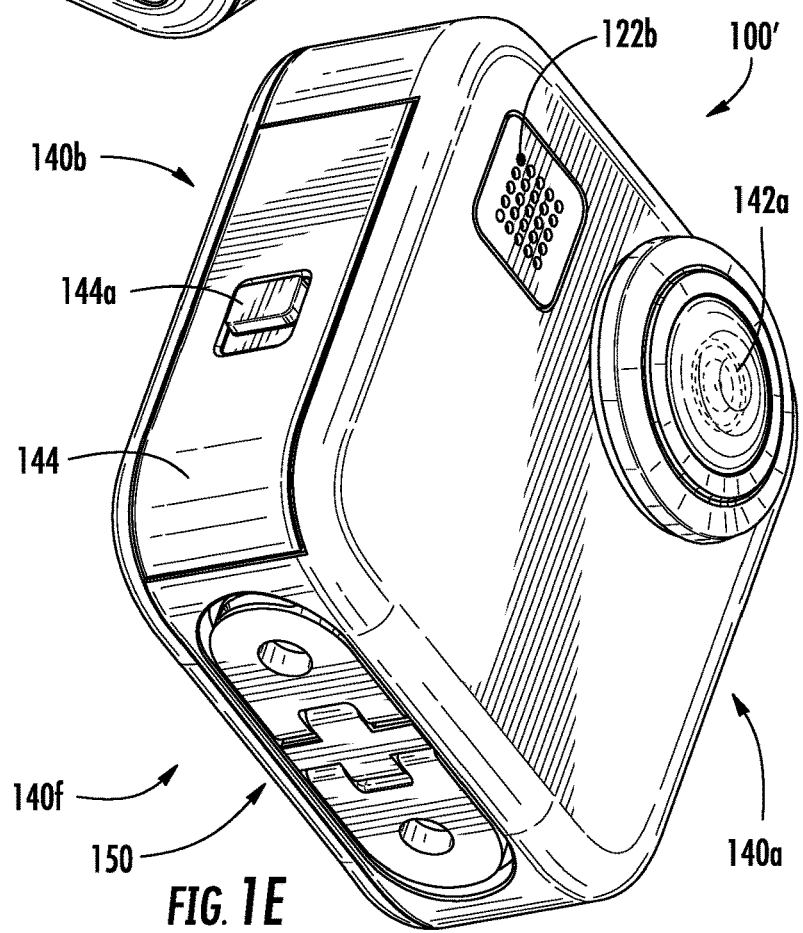
FIG. 1E is a lower, front, right perspective view of the camera of FIG. 1D.

FIG. 1A is a block diagram of electronic components of a camera 100 and a camera 100'. The camera 100 is a single-lens camera, and the camera 100' is a multi-lens camera that may be considered a variation of the camera 100. For ease of reference, the electronic components of FIG. 1A are described primarily with reference to the camera 100 but should be understood to be included in the camera 100'. FIGS. 1B and 1C are perspective views of an example of the camera 100. FIGS. 1D and 1E are perspective views of the camera 100'.

Referring to FIG. 1A, the camera 100 includes electronic components 120 and a body 140 that contains or is otherwise coupled to the electronic components 120. The electronic components 120 may generally include capture components 122, a processing apparatus 124, data interface components 126, movement sensors 128, power components 130, and/or user interface components 132.

The capture components 122 include one or more image sensors 122a for capturing images and one or more microphones 122b for capturing audio.

The image sensor 122a is configured to detect light of a certain spectrum (e.g., the visible spectrum or the infrared spectrum) and convey information constituting an image as electrical signals (e.g., analog or digital signals). The image sensor 122a detects light incident through a lens. The image sensor 122a may be any suitable type of image sensor, such as a charge-coupled device (CCD) sensor, active pixel sensor (APS), complementary metal-oxide-semiconductor (CMOS) sensor, N-type metal-oxide-semiconductor (NMOS) sensor, and/or any other image sensor or combination of image sensors. Image signals from the image sensor 122a may be passed to other electronic components 120 of the camera 100 via a bus 139, such as to the processing apparatus 124. In some implementations, the image sensors 122a include a digital-to-analog converter. The camera 100' includes multiple of the image sensors 122a (e.g., two as described below).

The one or more microphones 122b are configured to detect sound, which may be recorded in conjunction with capturing images to form a video.

The processing apparatus 124 may be configured to perform image signal processing (e.g., filtering, tone mapping, stitching, and/or encoding) to generate output images based on image data from the image sensors 122a. The processing apparatus 124 may include one or more processors having single or multiple processing cores. In some implementations, the processing apparatus 124 may include an application specific integrated circuit (ASIC). For example, the processing apparatus 124 may include a custom image signal processor. The processing apparatus 124 may exchange data (e.g., image data) with other components of the camera 100, such as the image sensor 122*a*, via the bus 139.

The processing apparatus 124 may include memory, such as a random-access memory (RAM) device, flash memory, or another suitable type of storage device, such as a non-transitory computer-readable memory. The memory of the processing apparatus 124 may include executable instructions and data that can be accessed by one or more processors of the processing apparatus 124. For example, the processing apparatus 124 may include one or more dynamic random-access memory (DRAM) modules, such as double data rate synchronous dynamic random-access memory (DDR SDRAM). In some implementations, the processing apparatus 124 may include a digital signal processor (DSP).

The one or more data interface components 126 enable communication between the camera 100 and other electronic devices, such as a remote control, smartphone, tablet computer, laptop computer, desktop computer, or storage device. For example, the data interface components 126 may be used to receive commands for operating the camera 100, transfer image data to the other electronic device, and/or transfer other signals or information to and from the camera 100. The data interface components 126 may be configured for wired and/or wireless communication. For example, the data interface components 126 may include an input/output (I/O) interface 126*a* that provides wired communication for the camera 100, which may be a USB interface (e.g., USB type-C), a high-definition multimedia interface (HDMI), or a FireWire interface. The data interface components 126 may include a wireless data interface 126*b* that provides wireless communication for the camera 100, such as being a Bluetooth interface, a ZigBee interface, and/or a Wi-Fi interface. The data interface components 126 may include a storage interface 126*c*, such as a memory card slot, that is configured to receive and operatively couple to a storage device (e.g., a memory card) for data transfer with the camera 100 (e.g., for storing captured images and/or recorded audio).

The movement sensors 128 may detect the position and movement of the camera 100. The movement sensors 128 include one or more of a position sensor 128*a*, an accelerometer 128*b*, or a gyroscope 128*c*. The position sensor 128*a*, such as a global positioning system (GPS) sensor, is used to determine a position of the camera 100. The accelerometer 128*b*, such as a three-axis accelerometer, measures linear motion (e.g., linear acceleration) of the camera 100. The gyroscope 128*c*, such as a three-axis gyroscope, measures rotational motion (e.g., rate of rotation) of the camera 100.

The power components 130 may receive, store, and/or provide power for operating the camera 100. The power components 130 may include a battery interface 130*a* and a battery 130*b*. The battery interface 130*a* operatively couples to the battery 130*b*, for example, with conductive contacts to transfer power from the battery 130*b* to the other electronic components of the camera 100. The power components 130 may also include the I/O interface 126*a*, which may receive power from an external source, such as a wall plug or external battery, for operating the camera 100 and/or charging the battery 130*b*.

The user interface components 132 may allow the user to interact with the camera 100, for example, providing outputs to the user and receiving inputs from the user. The user interface components 132 may include one or more visual output components 134 that visually communicate information and/or present captured images to the user. The visual output components 134 may include one or more lights 134*a* and/or one or more displays 134*b*. One or more of the displays 134*b* may be configured as a touch screen that receives inputs from the user. The user interface components 132 may also include one or more speakers 136, which function as audio output components that audibly communicate information and/or present recorded audio to the user. The user interface components 132 may also include one or more physical input interfaces 138 that are physically manipulated by the user to provide input to the camera 100. The physical input interfaces 138 may, for example, be configured as buttons or switches. The user interface components 132 may also be considered to include the one or more microphones 122*b*, which may function to receive audio inputs from the user, such as voice commands.

Referring first to FIGS. 1B and 1C, the camera 100 includes the body 140, one or more lenses 142 (e.g., one as shown), and one or more doors 144 (e.g., one as shown).

The body 140 of the camera 100 forms the exterior surfaces of the camera 100 and houses and protects internal electronic components. In the present example, the exterior includes six sides (i.e., a front side 140*a*, a left side 140*b*, a right side 140*c*, a rear side 140*d*, a top side 140*e*, and a bottom side 140*f*) that form a rectangular cuboid. Various sides of the body 140 may include and/or be formed by various other components, such as the lens 142 and the displays 134*b* (as discussed below). In other embodiments, the exterior may have a different shape. Components forming the body 140 of the camera 100 may be made of one or more rigid materials such as plastic, aluminum, steel, or fiberglass.

As illustrated, the lens 142 may be arranged on the front side 140*a* of the body 140. The lens 142, as shown, allows light to pass therethrough to the image sensor 122*a* that is contained in the body 140. The lens 142 is a transparent structure that protects internal components of the camera 100, such as the image sensor 122*a* and an optical element (e.g., refractive lens).

The camera 100 may include one or more of the microphones 122*b*, which are configured to receive and record audio signals in conjunction with recording video. The microphones 122*b* may also detect sound that includes voice commands from the user for operating the camera 100. The camera 100 may also include another microphone (not shown) integrated into the body 140. The front surface of the camera 100 may include two drainage ports as part of a drainage channel 143.

The camera 100 may include the I/O interface 126*a* (e.g., hidden as indicated using dotted lines), such as a universal serial bus (USB) type-C socket or other standardized or proprietary interface. As best shown in FIG. 1B, the I/O interface 126*a* can be covered by the door 144 of the camera 100. The door 144 is hingedly coupled to the body 140 of the camera 100 and can be secured to the body, for example, using a latch 144*a* that releasably engages the body 140 generally opposite the hinge. The door 144 may, in addition to covering the I/O interface 126*a*, cover other types of electronic interfaces (not shown) of the camera 100, such as the storage interface 126*c* that receives a storage device (e.g., a memory card) and/or the battery interface 130*a* that operatively couples to the battery 130*b*. The door 144 may seal with the body 140, for example, providing a watertight seal that prevents water and other debris from reaching the I/O interface 126a and the other electronic interfaces. The door 144 may also be removable from the body 140.

As referenced above, the camera 100 may include one or more visual output components 134, which may include one or more lights 134a (e.g., light-emitting diodes or LEDs) and displays 134b (e.g., liquid crystal display screens or LCDs). The visual output components 134 communicate various information to the user about the camera 100. The lights 134a may be illuminated in various patterns and/or colors, for example, to indicate that the camera 100 is currently recording. The one or more displays 134b may display images and information, such as image capture information (e.g., resolution, frames-per-second), image capture mode (e.g., still frame or video), or status information of the camera 100 (e.g., recording time or battery life remaining). As shown, the displays 134b may be arranged on each of the front side 140a (e.g., a front display screen 134b″) and the back side 140d (e.g., a rear display screen 134b') of the body 140 of the camera 100.

As referenced above, one or more of the displays 134b may be configured as an interactive display that allows for interaction with the camera 100 while simultaneously displaying information on a surface of the camera 100. For example, the rear display screen 134b' on the rear side 140d of the body 140 may be a touch screen that detects user touch (e.g., capacitively) for receiving user inputs for controlling various operations of the camera 100.

The camera 100 may also include the physical input interfaces 138, such as buttons or switches configured to allow a user to control electronic operations the camera 100. The physical input interfaces 138 may allow a user to turn the camera 100 on, select between different modes of operation, and/or to instruct the device to capture images (e.g., still images or video). For example, as shown in FIG. 1B, one of the physical input interfaces 138 is a button positioned on the top side 140e of the body 140 and is configured as a shutter button that, when pressed by the user, causes the camera 100 to capture one or more images. As another example, as shown in FIG. 1C, one of the physical input interfaces 138 is a button that is positioned on the left side 140b of the camera 100 and is configured as a mode button that, when pressed by the user, causes the camera 100 to change between modes, such as between modes for capturing still images, capturing video, or playback of still images or video. The camera 100 may further include other physical input interfaces, such as other buttons, switches, hinges, or latches configure to allow the user to operate various mechanical features of the camera 100, such as doors or other access panels.

Referring to FIGS. 1D-1E, the camera 100' is a multi-lens camera having multiple of the lenses 142 associated with each of the multiple image sensors 122a, as referenced above. More particularly, the camera 100' is a dual-lens camera of which the lenses 142 are disposed (e.g., coupled to) opposite sides of the body 140 and may face opposite directions. The lenses 142 include a front lens 142a on the front side 140a and a rear lens 142b on the rear side 140d of the body 140. The front lens 142a is coupled to and directs light onto one of the two image sensors 122a (referred to herein as the front image sensor 122a), and the rear lens 142b is coupled to and directs light onto the of the two image sensors 122a (referred to herein as the rear image sensor 122a). Each assembly of the lens 142 and the image sensor 122a may be referred to as an integrated sensor-lens assembly ("ISLA"), such as a front ISLA 147a and a rear ISLA 147b that may be coupled to each other in fixed alignment to form a dual-ISLA assembly 147. The camera 100' also includes similar of the electronic components 120 and various of the physical components (e.g., the user interface components 132, the body 140, and subcomponents or features thereof). For ease of reference, like components are generally represented by the same reference numerals for the camera 100' as with the camera 100.

The body 140 of the camera 100 and the camera 100' defines an internal compartment that contains various of the electronic components 120 and that may be waterproof. The body 140 may be sealed so that water is prevented from entering the body 140 and into contact with the electronic components 120. The body 140 generally includes an outer housing that may be considered to further include the displays 134b, as referenced above, or others of the electronic components 120 that form an outer surface of the body 140 and/or seal apertures of the outer housing. The body 140 may also be considered to further include the door 144, which forms an outer surface of the body 140 and may engage other portions of the body 140 to seal an aperture of the primary structural components of the body 140.

Figure 2A:
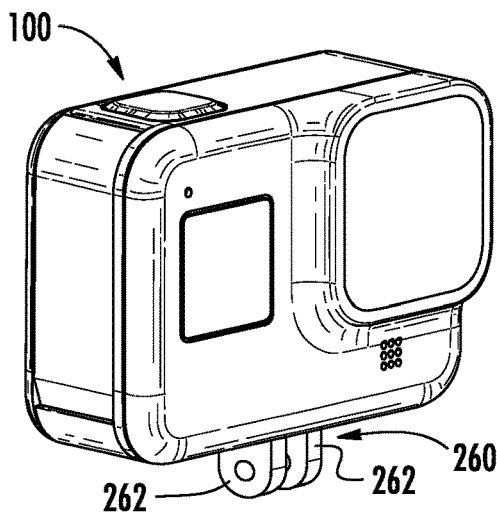
FIGS. 2A-2C are perspective, front, and left side views of the camera of FIG. 1B with a mount in an extended configuration.
Figure 2D:
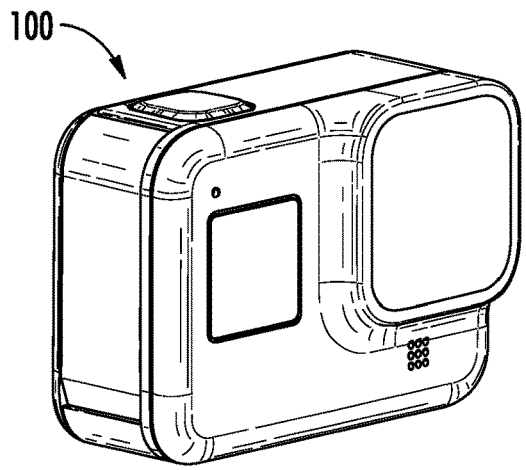
FIGS. 2D-2F are perspective, front, and left side views of the camera of FIG. 1B with the mount in a stowed configuration.
Figure 2B:
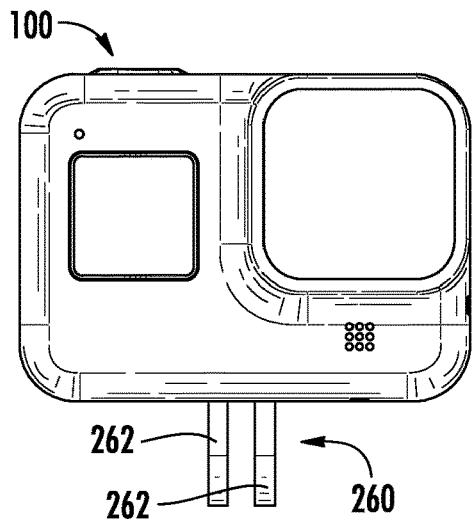
Figure 2E:
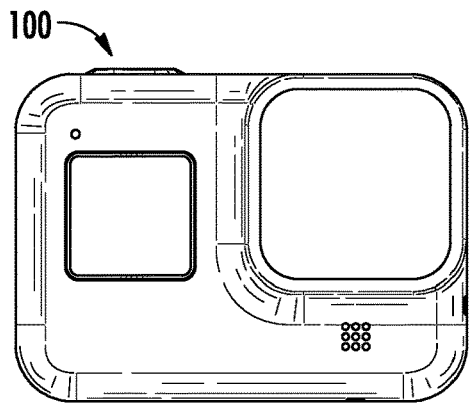
Figure 2C:
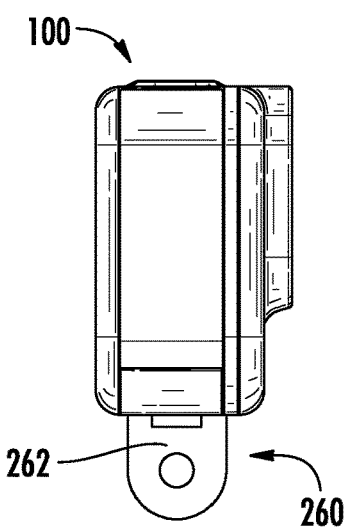
Figure 2F:
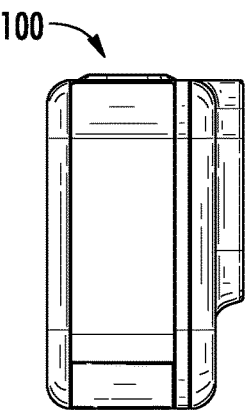

Referring to FIGS. 2A-3B, the camera 100 may also include a mount 260. The mount 260 functions to removably couple the camera 100 to another device, such as a tripod or other support device 370 (see FIGS. 3A-3B). As shown, the mount 260 includes two finger members 262 that pivot relative to the body 140 between stowed positions (as shown in FIGS. 1C and 2D-2F) and deployed positions (as shown in FIGS. 2A-2C). When in the deployed positions, the two finger members 262 extend away from the body 140 in parallel and are insertable between complementary finger members 372 of the support device 370. The mount 260 may additionally include a base 264 to which the two finger members 262 are pivotably coupled and which is in turn coupled to the body 140 of the camera 100.

Each of the finger members 262 is a generally planar member (e.g., having parallel planar surfaces) that extends between a proximal end and a distal end thereof. The proximal end is positioned proximate the camera 100 and hingedly coupled to the base 264, for example, with a hinge pin that defines a pivot axis about which the finger member 262 rotates. The proximal end may be rounded about the pivot axis. The proximal end of the finger member 262 may also be referred to as a pivot end.

The distal end is positioned distally from the proximal and from the pivot axis. The distal end is movable relative to the body 140 and, accordingly, may be referred to as a free end. The finger members 262 may each include a recess 262a in the distal end between the parallel planar surfaces, which forms a finger pick that may be engaged by the finger (e.g., finger nail) of the user to facilitate rotating the finger member 262 from the stowed to the deployed position.

Each of the finger members 262 further includes an aperture 262b positioned between the proximal end and the distal end, which extends between the planar surfaces thereof (e.g., perpendicular thereto). When the two finger members 262 are in the deployed positions, the apertures 22b thereof are aligned with each other so as to receive a shaft of a thumbscrew 374 of the support device 370 therethrough, which also extends through apertures of the complementary finger members 262 of the support device 370 for coupling the mount 260 to the support device 370. The distal end of each of the finger members 262 may be rounded about the apertures 260a (e.g., a center axis thereof), so as to permit the finger members 262 to pivot relative to the support device 370.

The mount 260 may be configured to retain the finger members 262 in the stowed and/or deployed positions. For example, the finger members 262 may be retained in the stowed and/or deployed positions magnetically and/or frictionally. As shown, the finger members 262 may be retained magnetically in the stowed positions. The finger members 262 each include a magnet 262c, which is arranged between the pivot axis and the aperture 262b thereof. The magnet 262c magnetically couples to the base 264, or other magnetic portion of the camera 100, to retain the finger member 262 in the stowed position. The finger members 262 may be retained frictionally in the deployed positions. The finger members 262 are each fixedly coupled to the hinge pin (not shown), which is in turn frictionally engaged with the body 140, for example, with an elastomeric friction pad pressing the hinge pin to resist rotation thereof.

The mount 260 is positioned at the bottom side 140f of the body 140 of the camera 100. For example, as shown, the mount 260 is positioned within a mount receptacle 150 formed in the bottom side 140f of the body 140 and below the internal compartment. As shown, the mount receptacle 150 is recessed relative to a bottommost surface of the body 140. For example, the mount receptacle 150 is defined by a recessed (e.g., concave) portion of the body 140, which as shown may be defined by the bottom wall of the body 140. The recessed portion generally includes a peripheral wall that extends upward from the bottommost surface of the body 140 and defines the horizontal shape and bounds (e.g., length and width) of the mount receptacle 150, as well as a top wall that extends across the peripheral wall and defines the vertical shape and bounds (e.g., the depth) of the mount receptacle 150.

The shape and dimension of the mount receptacle 150 may permit the mount 260 (e.g., the finger members 262) to be contained entirely therein when the finger members 262 are in the stowed positions. For example, the depth of the mount receptacle 150 at locations corresponding to the finger members 262 may be the same or greater than the thickness of the finger members 262, such that the finger members 262 are flush or recessed relative to the bottommost surface of the body 140 when in the stowed positions. As a result, the camera 100 may rest stably on a flat support surface, such as a table. The horizontal shape and dimensions of the mount receptacle 150 permit access to the distal ends of the finger members 262 (e.g., to the recesses 262a thereof), thereby allowing the user to engage and pull the finger members 262 from the stowed position to the deployed position. The horizontal shape of the mount receptacle 150, which is visible at the bottom side 140f of the body 140, may correspond to that of the finger members 262, such that a generally uniform gap is formed laterally between the recessed portion of the body 140 (and the finger members 262. For example, as shown, the mount receptacle 150 includes ends that are rounded (e.g., forming semicircles at left and right sides thereof) and correspond to the distal ends of the finger members 262 which are also rounded.

The portion of the body 140 defining the mount receptacle 150 is sealed, such that the internal compartment is waterproof. The mount 260 is coupled to the body 140, and may further be coupled to an internal chassis located within the internal compartment, such as with threaded fasteners (not shown).

Referring to FIGS. 4A-4H, a camera case 480 may be used with the camera 100. The camera case 480 may also be referred to as a camera enclosure. The combination of the camera case 480 and the camera 100 may be referred to as a camera system. An adaptation of the camera case 480 may be usable with camera 100'.

The camera case 480 is configured as a floatation device for the camera 100. The camera case 480 is formed of a compliant foam material of sufficient amount (e.g., volume) to provide sufficient buoyancy for the camera system (i.e., the camera and the camera case 480) to float in water. The foam material of the camera case 480 may, for example, be a closed cell foam, an open cell form, or both. The foam material may be neoprene, Ethylene Propylene Diene Monomer (EPDM), Styrene-butadiene (SBR), Polyvinyl chloride (PVC), Nitrile rubber (NBR), Polyurethane, Polyethylene, Chloroprene elastomeric foam, Ethylene-vinyl acetate (EVA), or a combination thereof. The camera case 480 may also be referred to has a camera float case.

The camera case 480 defines a cavity 482 in which is received the camera 100. The cavity 482 is defined by interior surfaces of a top side, a right side, a bottom side, and a left side of the camera case 480, which have a shape that closely corresponds to and otherwise conforms with the shape of the exterior surfaces of the body 140 of the camera 100 (e.g., the front side 140a, the left side 140b, the right side 140c, the rear side 140d, the top side 140e, and the bottom side 140f). The top, right, left, and bottom sides of the camera case 480 engage the camera 100 to prevent movement of the camera 100 within the cavity 482. At front and rear sides, the camera case 480 extends partly inward from the top, right, left, and bottom sides to form flanges that also engage outer portions of the front side 140a and the rear side 140d of the camera 100 for retention thereof in the cavity 482 and that define a front opening 484b and a rear opening 484a, respectively.

The camera case 480 defines the rear opening 484a, the front opening 484b, and other primary apertures that correspond to features of the camera 100 that the user may require access to while the camera 100 is capturing images. The primary apertures generally include the rear opening 484a on the back side of the camera case 480, the front opening 484b the front side of the camera case 480, and a mount opening 484c on the bottom side of the camera case 480. The rear opening 484a provides access to the rear display screen 134b' of the camera 100. The front opening 484b surrounds the front display screen 134b" and the lens 134b' thereby allowing the front display screen 134b" to be viewed and for light to pass to the lens 142 for image capture. The mount opening 484c allows the mount 260 (e.g., the finger members 262 thereof) to pass through the camera case 480 and couple to the support device 370. The camera case 480 may also include microphone openings 484d that permit sound waves to travel through the case to the microphones 122b of the camera 100. Further, the camera case 480 may also include button recesses 486 that allow the user to operate the physical input interface 138 of the camera 100. A finger or device (e.g., pen) may extend through the button recess 486 to directly contact the physical input interface 138 of the camera 100.

The rear opening 484a and the front opening 484b align with and allow the user to view therethrough the rear display screen 134b' and the front display screen 134b", respectively. The front opening 484b also surrounds the lens 142 and allows light from the environment to pass therethrough to the image sensor 122a. The front opening 484b is also the largest aperture of the camera case 480 and due to the flexibility and elasticity of the material forming the camera case 480 (e.g., foam) permits the camera 100 to pass therethrough to be inserted into and removed from the cavity 482.

The mount opening 484c permits the finger members 262 of the mount 260 to extend through the bottom side of the camera case 480 and couple to be received by the complementary finger members 372 of the support device 370. The mount opening 484c permits a finger of a user to extend into contact with the finger members 262 to move the finger members 262 between a stowed position and a deployed position.

The bottom side of the camera case 480 that defines the mount opening 484c has a relatively high thickness as compared to the mount 260 and, in particular, as compared to a distance from the bottom side 140f of the camera 100 to the aperture 262b of the finger members 262 when in the deployed state. Accordingly, the mount opening 484c may be sized to receive the complementary finger members 372 of the support device 370 therein, for example, by having a width that is wider than the distance between the outer surfaces of the complementary finger members 372 of the support device 370.

Furthermore, the bottom side of the camera case 480 includes one or more bottom recesses 484e (e.g., two as shown) that extend laterally outward from the mount opening 484c. The bottom recesses 484e are concave (e.g., having a partial circular shape) and elongated in a lateral direction. The bottom recesses 484e are each configured to receive the thumbscrew 374 therein and, for example, provide sufficient clearance thereto for rotation thereof without interference (e.g., without engagement) from the camera case 480. The mount opening 484c, the bottom recesses 484e, or both may permit the support device to rotate at an angle of about 90 degrees or more, about 120 degrees or more, about 160 degrees or more, about 180 degrees or more, or about 225 degrees or less.

The microphone openings 484d align with the microphones 122b of the camera 100 to permit sound from the environment to travel thereto. The camera case 480 may also include a microphone drain channel 484f (see FIGS. 4K-4L) that allows water to drain from the microphone openings 484d. For example, the microphone drain channel 484f may be formed as a recessed surface inside the cavity 482, which extends from the microphone opening 484d to the mount opening 484c. For clarity, the microphone drain channel 484f is illustrated in dashed lines, which should be understood as normally being hidden in the views shown.

The one or more button recesses 486 are configured to be pressed by the user for operating the physical input interface 138. Each button recess 486 is aligned with (e.g., is at a corresponding location to) a corresponding one of the physical input interfaces 138 of the camera 100 (e.g., a shutter button on the top side 140e of the camera 100 and a mode button on the left side 140b of the camera 100). The button recesses 486 may be an absence of material so that a user's finger or a device (e.g., a pen or pencil) may extend through the button recess 486 into direct contact with the input interface 138. The user may indirectly press the physical input interface 138 of the camera by pressing the compliant foam material that defines the button recess 486. The button recess 486 is formed in the material forming the camera case 480 and has reduced thickness as compared to the material surrounding the button recess 486. The button recesses 486 may be flexible and may be moved into contact with the input interface 138 so that the button recesses 486 actuate the input interfaces 138. For example, the button recess 486 may be recessed relative to the surrounding material toward the cavity 482 a depth of 25% or more of the thickness of the material therearound (e.g., approximately 40%, 50% or more). The material behind the button recess 486 may have a thickness that is less than 75% (e.g., approximately 60%, 50%, or less) the thickness of the material surrounding and defining the button recess 486. As shown, the button recess 486 may be tapered, narrowing moving inward toward the camera 100.

On an interior side at locations corresponding to the button recesses 486, the camera case 480 may include a protrusion 486a that functions to concentrate and transfer force from the user pressing the camera case 480 in the button recess 486 to the physical input interface 138 of the camera. As shown in the cross-sectional views of FIGS. 4D and 4E, the protrusion 486a may be surrounded by an interior recess, or alternatively as shown in the detail view of FIG. 4H, may protrude from surrounding interior surfaces of the camera case 480 that are generally flat and engage the respective input interface 138 of the camera 100.

As referenced above, the camera case 480 includes sufficient material for the camera 100 to float. The camera case 480 may have sufficient buoyancy to float a camera 100, 110', a support device 370, or both. In one implementation, the camera case 480 (i.e., the material thereof) may protrude rearward from the cavity 482 (e.g., relative to the camera 100 therein) further rearward than in other directions, for example extending rearward a distance 50%, 75%, or more (e.g., approximately 100% or more, as shown) than from one or more of the front side, the right side, the left side, the bottom side, or the top side of the camera 100 and/or the cavity 482 (e.g., three, four, or each of such sides). The camera case 480 may function to rotate a camera 100, 100' if the camera 100, 100' is dropped in water so that the camera 100, 110' is oriented in a predetermined position.

Figure 4A:
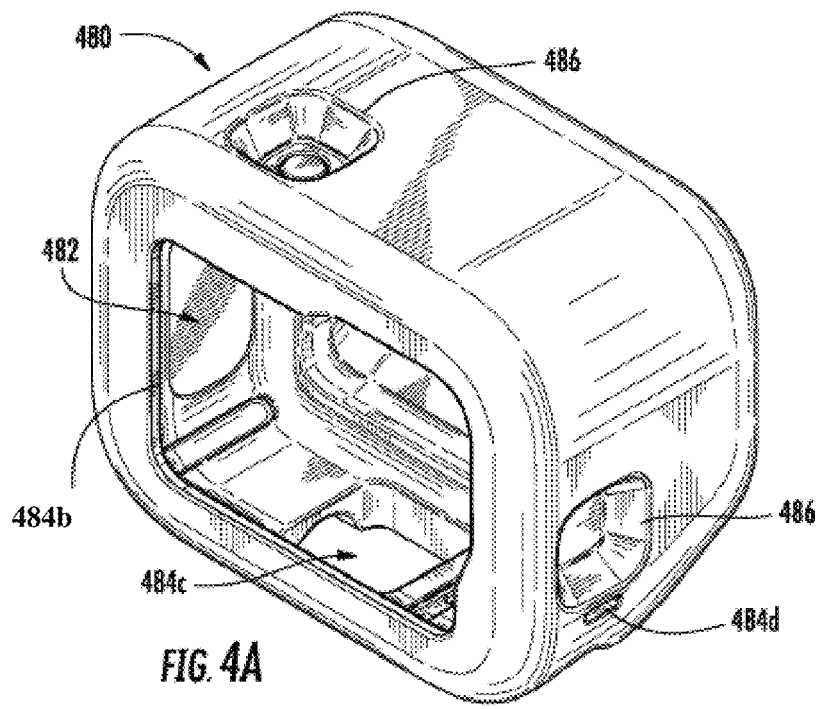
FIG. 4A is an upper, front, right perspective view of a camera case.
Figure 4B:
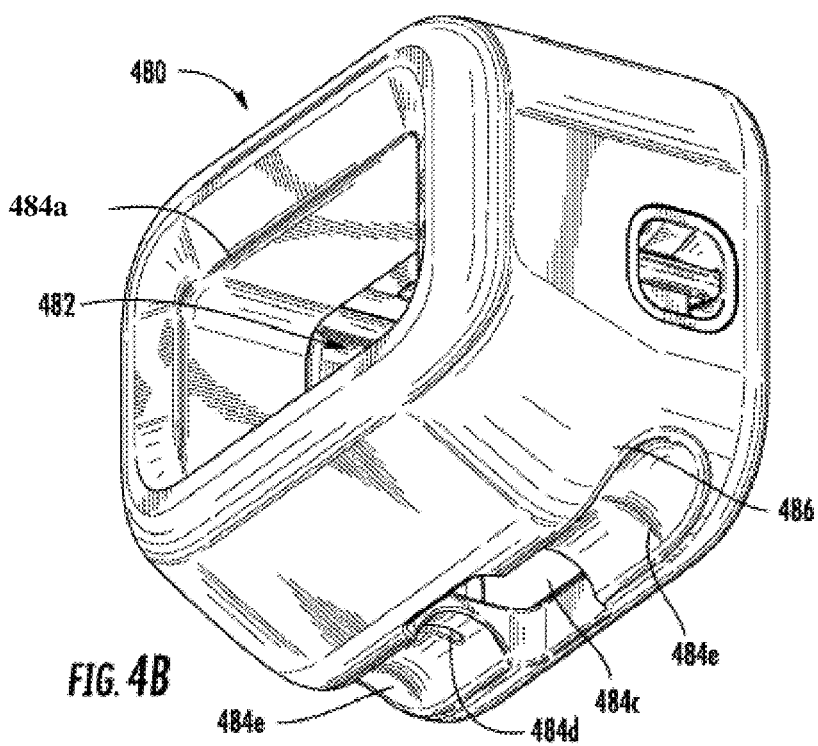
FIG. 4B is a lower, rear, left perspective view of the camera case of FIG. 4A.
Figures 4C, 4D:
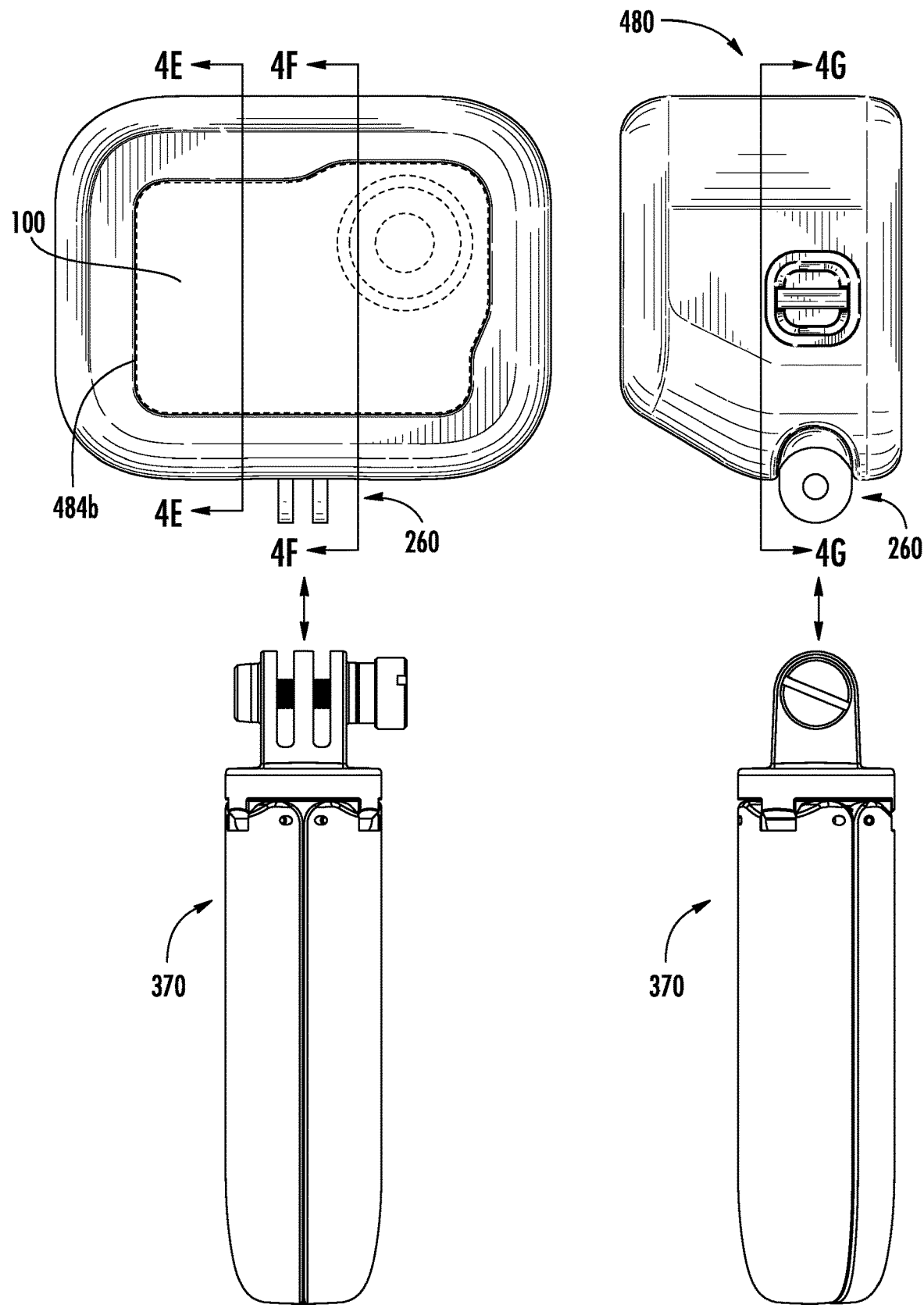
FIG. 4C is a front view of a camera system having the camera of FIG. 1B and the case of FIG. 4A removed from the support device of FIG. 3A.
FIG. 4D is a side view of the camera system of FIG. 4C.
Figure 4E:
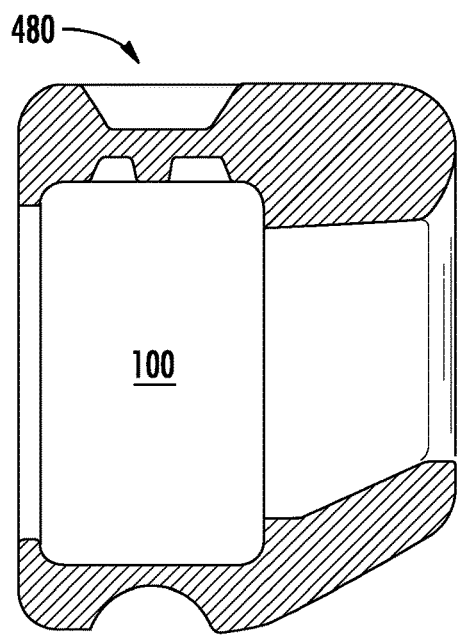
FIG. 4E is a cross-sectional view of the camera system of FIG. 4C taken along line 4E-4E in FIG. 4C.
Figure 4F:
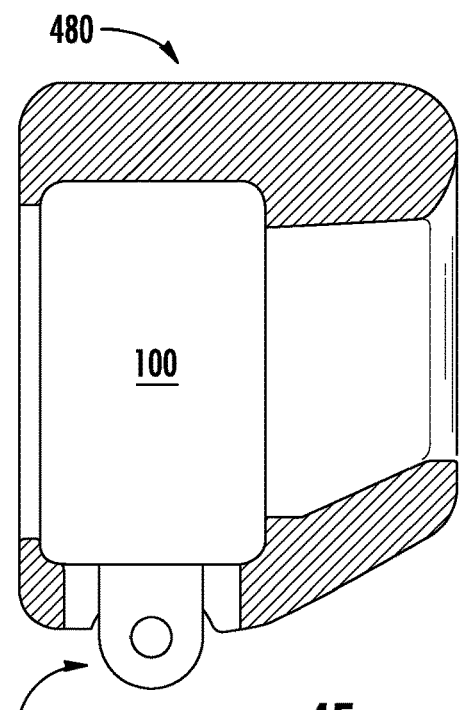
FIG. 4F is a cross-sectional view of the camera system of FIG. 4C taken along line 4F-4F in FIG. 4C.
Figure 4G:
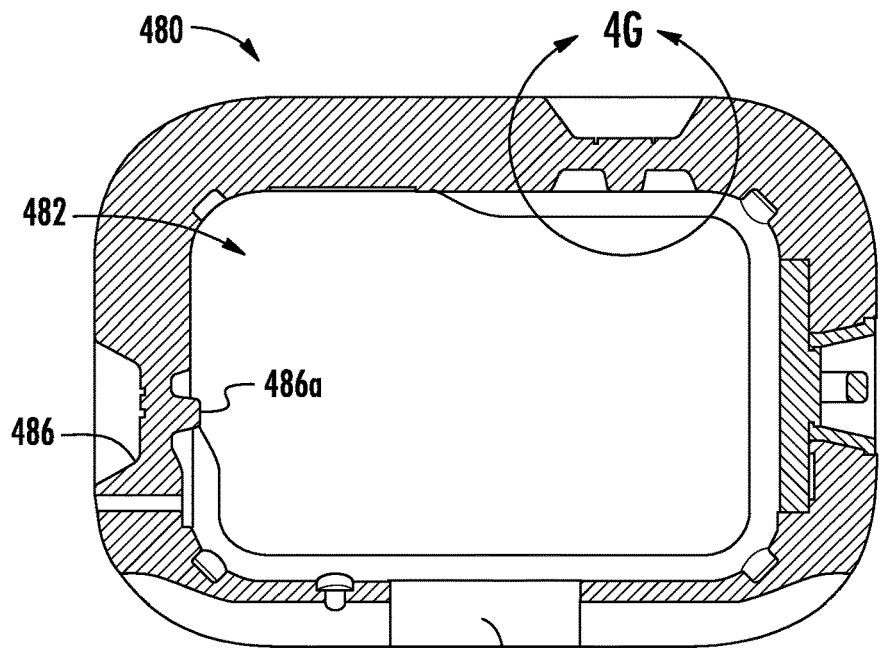
FIG. 4G is a cross-sectional view of the camera case of FIG. 4A without the camera taken along line 4G-4G from FIG. 4D.
Figure 4H:
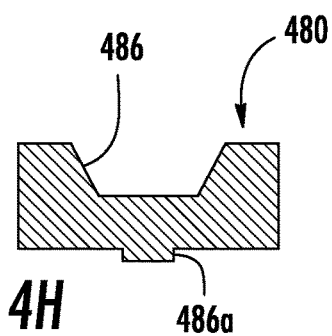
FIG. 4H is a detail view of an alternative embodiment of a button recess of a camera case taken along circle 4H in FIG. 4G.
Figure 4I:
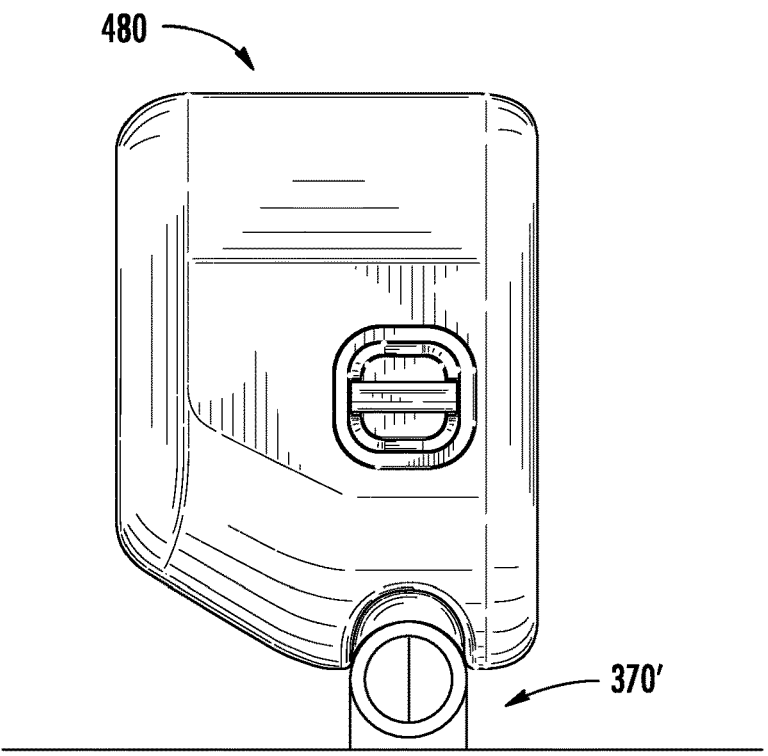
FIG. 4I is a side view of the camera system with another support device in a first configuration.
Figure 4J:
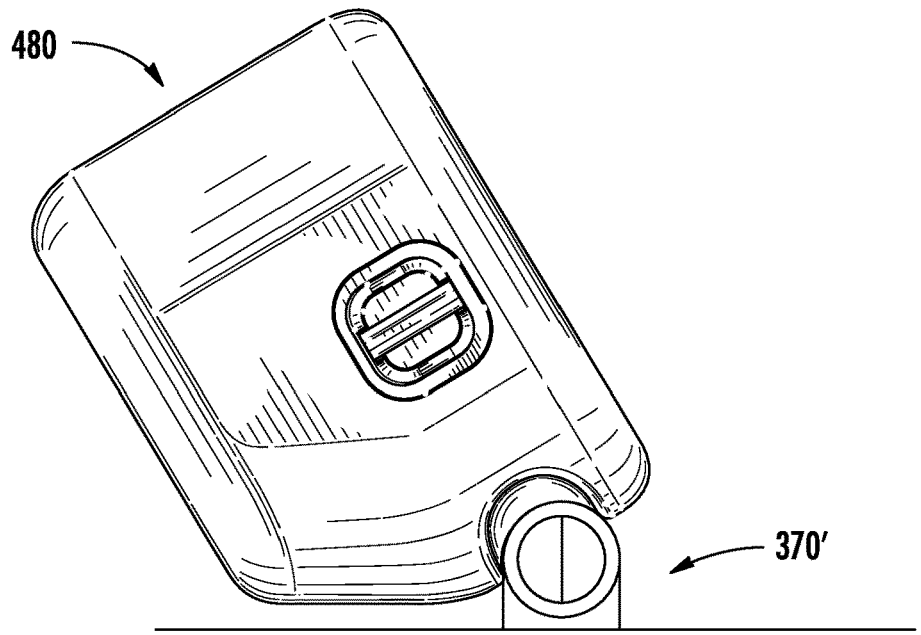
FIG. 4J is a side view of the camera system with another support device in a second configuration.
Figure 4K:
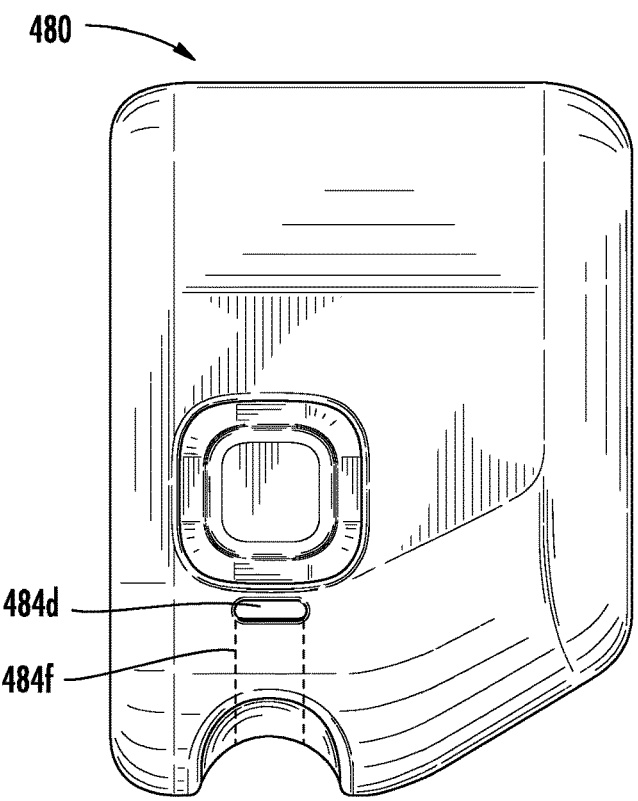
FIGS. 4K and 4L are side and front views of the camera case illustrating a microphone drainage channel in dashed lines.
Figure 4L:
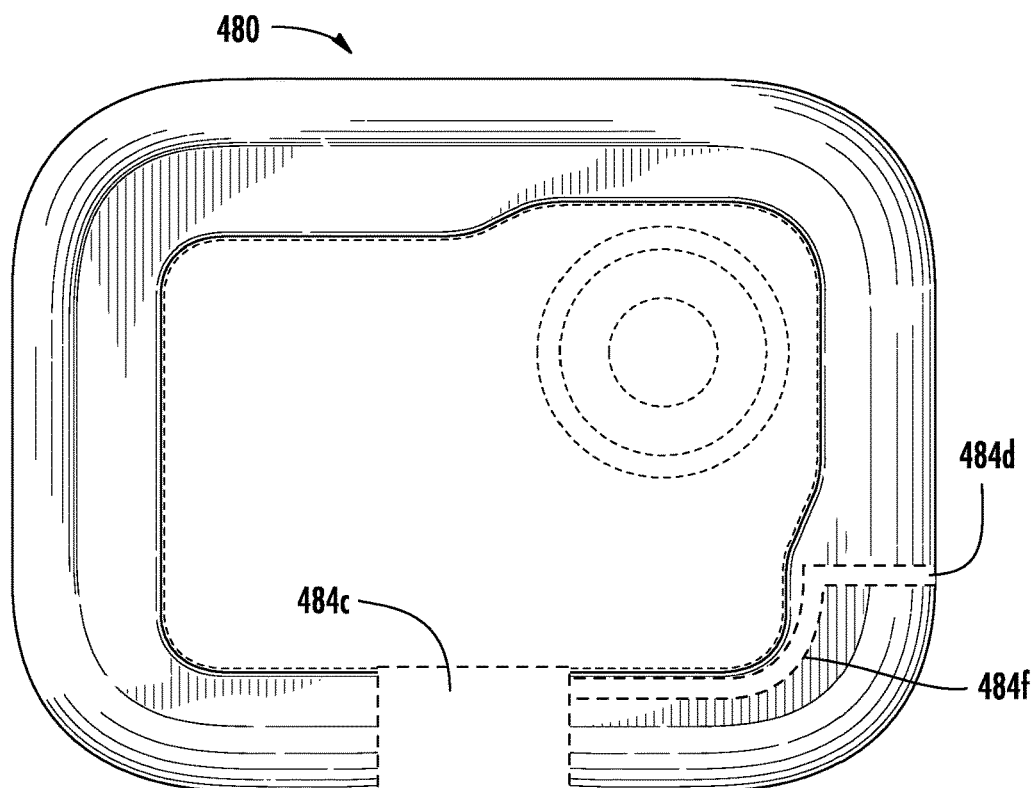

To account for the thickness on the rear side of the camera case 480, a bottom surface thereof may be sloped upward (e.g., the camera case 480 reduces in vertical dimension moving rearward, for example, being tapered or having a bottom rear corner that is chamfered) to allow the camera case 480 to be tilted relative to a variation of the support device 370' and not engage a flat surface thereunder (see compare FIGS. 4I and 4J). For example, the camera 100 may be mounted to a surfboard or other generally flat surface with the support device 370', and the camera 100 may be tilted rearward without the camera case 480 engaging the surfboard thereunder. In another example, the camera 100 may be placed on a surface (e.g., a flat surface) and the taper may angle the camera 100 so that a video or picture may be taken without a user holding the camera 100. The taper of the camera case 480 may face the camera 100. 100' at an angle of about 15 degrees or more, about 30 degrees or more, about 45 degrees or more, or about 90 degrees or less (e.g., ±5 degrees) relative to a surface the camera case 480 is resting on.

The rear opening 484a may also reduce in size (e.g., height) moving rearward. This allows the camera case 480 to include additional buoyant material (e.g., offsetting the reduction from the tapered rear end), while still permitting the use to view and access the rear display screen 134b'.

Persons skilled in the art will understand that the various embodiments of the disclosure described herein, and shown in the accompanying figures, constitute non-limiting examples, and that additional components and features may be added to any of the embodiments discussed hereinabove without departing from the scope of the present disclosure. Additionally, persons skilled in the art will understand that the elements and features shown or described in connection with one embodiment may be combined with those of another embodiment without departing from the scope of the present disclosure to achieve any desired result and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the disclosure, as are alternative embodiments that may result from combining, integrating, and/or omitting features from any of the disclosed embodiments.

Use of the term "optionally" with respect to any element of a claim means that the element may be included or omitted, with both alternatives being within the scope of the claim. Additionally, use of broader terms such as "comprises," "includes," and "having" should be understood to provide support for narrower terms such as "consisting of," "consisting essentially of," and "comprised substantially of." Accordingly, the scope of protection is not limited by the description set out above, but is defined by the claims that follow, and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward," "downward," "inward," "outward," "horizontal," "vertical," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "approximately," "generally," "substantially," and the like should be understood to allow for variations in any numerical range or concept with which they are associated. For example, it is intended that the use of terms such as "approximately" and "generally" should be understood to encompass variations on the order of 25%, or to allow for manufacturing tolerances and/or deviations in design.

Although terms such as "first," "second," etc., may be used herein to describe various operations, elements, components, regions, and/or sections, these operations, elements, components, regions, and/or sections should not be limited by the use of these terms in that these terms are used to distinguish one operation, element, component, region, or section from another. Thus, unless expressly stated otherwise, a first operation, element, component, region, or section could be termed a second operation, element, component, region, or section without departing from the scope of the present disclosure.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. A camera case comprising:
   a buoyant material that forms a cavity defined by a top side, a right side, a bottom side, and a left side, the cavity configured to removably receive a camera;
   a front opening extending into the cavity;
   a rear opening located opposite the front opening, wherein the rear opening is larger than the front opening so that the camera is extendable into the cavity through the rear opening;
   a button recess in the top side that aligns with a physical input interface of the camera; and
   a mount opening extending through the bottom side of the camera case that receives a portion of a support member so that the support member and the camera are connectable through the mount opening,
   wherein the front opening comprises:
   a bottom edge; and
   a top edge which extends partly downward from a top side of the front opening that has a high portion that does not extend partly downward from an edge of the cavity and a low portion that extends downward partly downward from an edge of the cavity below the high portion towards the bottom edge and the mount opening so that a distance from the low portion to the bottom edge is less than a distance from the high portion to the bottom edge, and
   wherein the camera case includes a sufficient amount of the buoyant material to float the camera in water when the camera is inserted into the cavity.

2. The camera case according to claim 1, wherein the button recess is a through hole that a finger or a device is able to extend through to physically contact the physical input interface of the camera.

3. The camera case according to claim 1, further comprising:
   a side button recess located in the left side of the buoyant material that aligns with a side physical input interface of the camera, wherein the mount opening includes one or more bottom recesses that extend laterally outward from the mount opening, the one or more bottom recesses being concave.

4. A camera case comprising:
   a buoyant material that defines a cavity in which a camera is removably received;
   a front opening extending through a front surface of the buoyant material, wherein the front opening comprises:
   a bottom side;
   a top side located opposite the bottom side, the top side including a high portion that does not extend partly downward from an edge of the cavity and a low portion that extends partly downward from an edge of the cavity and that is located closer to the bottom side than the high portion;
   a first side extending between the bottom side and the top side; and
   a second side located opposite the first side and extending between the bottom side and the top side;
   a rear opening located opposite the front opening and extending through a rear surface of the buoyant material with the cavity being located between the front opening and the rear opening; and
   a button recess located in a top surface, a right surface, a left surface, a bottom surface, or a combination thereof, wherein the front opening and the rear opening are bounded by the top surface, the right surface, the left surface, and the bottom surface of the buoyant material, wherein the camera case includes a sufficient amount of the buoyant material for a camera system comprising the camera and the camera case to float in water.

5. The camera case according to claim 4, wherein the button recess is a through hole that a finger or a device is able to extend through to physically contact a physical input interface of the camera.

6. The camera case according to claim 5, wherein the physical input interface is a shutter button that when pressed causes the camera to capture one or more images.

7. The camera case according to claim 4, wherein the buoyant material is a foam material that is a closed cell foam, an open cell foam, or both.

8. The camera case according to claim 4, wherein the buoyant material is a foam material that is neoprene, ethylene propylene diene monomer, styrene-butadiene, polyvinyl chloride, nitrile rubber, polyurethane, polyethylene, chloroprene elastomeric foam, ethylene-vinyl acetate, or a combination thereof.

9. The camera case according to claim 4, wherein the rear opening is larger than the front opening.

10. The camera case according to claim 4, wherein the camera case is a rectangular cuboid.

11. The camera case according to claim 10, further comprising:
a mount opening that is oblong in shape, and
one or more bottom recesses that extend laterally outward from the mount opening,
wherein the one or more bottom recesses have a partial circular shape.

12. A camera case comprising:
a buoyant material that defines a cavity configured to removably receive a camera;
a front opening located on a front side of the cavity, the front opening is generally rectangular and has a top side with a split where a first portion of the top side extends below a second portion of the top side; and
a rear opening located on a rear side of the cavity and opposite the front opening,
wherein the camera case includes a sufficient amount of the buoyant material for the camera case to float in water, and
wherein the front opening and the rear opening surround the camera when the camera is received in the camera case so that a front surface of the camera is exposed through the front opening and a rear surface of the camera is exposed through the rear opening, and
wherein the first portion of the camera case extends partly inward from an edge of the cavity and the second portion is free of extending partly inward.

13. The camera case according to claim 12, further comprising:
a button recess extending through the buoyant material into the cavity so that when a camera is received in the camera case, a physical input interface of the camera is able to be pressed through the button recess.

14. The camera case according to claim 13, wherein the camera case forms a rectangular cuboid, and wherein the button recess is tapered or narrowing moving inward towards the cavity.

15. The camera case according to claim 13, wherein the cavity includes interior surfaces that define the cavity and the interior surfaces have a shape that conforms with a shape of exterior surfaces of the camera.

16. The camera case according to claim 15, wherein the interior surfaces of the cavity engage the exterior surfaces of the camera so that the camera is prevented from moving within the cavity.

17. The camera case according to claim 12, further comprising:
a button recess that is a through hole that a finger or device extends through to physically contact a physical input interface of the camera.

18. The camera case according to claim 12, wherein the buoyant material is a foam material.

* * * * *